United States
Plummer

[11] 3,744,391
[45] July 10, 1973

[54] CAMERA WITH A STIGMATIC FRESNEL OPTICAL ELEMENT

[75] Inventor: William T. Plummer, Concord, Mass.

[73] Assignee: Polaroid Corporation, Cambridge, Mass.

[22] Filed: Dec. 28, 1971

[21] Appl. No.: 213,021

[52] U.S. Cl. ............................ 95/42, 95/49, 350/211
[51] Int. Cl. ............................................. G03b 19/21
[58] Field of Search .................... 95/42, 44 R, 44 C, 95/49; 350/211, 295, 310; 355/44, 45, 52

[56] References Cited
UNITED STATES PATENTS

| | | | |
|---|---|---|---|
| 2,914,997 | 12/1959 | Grey | 95/44 X |
| 2,980,001 | 4/1961 | Sauer et al. | 95/44 C |
| 3,501,587 | 3/1970 | Herriott | 350/211 |
| 3,572,903 | 3/1971 | Hofmann | 350/211 |
| 3,641,889 | 2/1972 | Eloranta | 95/10 C E |

*Primary Examiner*—Samuel S. Matthews
*Assistant Examiner*—E. M. Bero
*Attorney*—Michael Bard, Robert F. Peck et al.

[57] ABSTRACT

The invention described herein provides a novel Fresnel mirror having a warp to correct astigmatism that might otherwise be introduced into an image by a Fresnel optical element. Fresnel optical elements according to the present invention are particularly useful in optical systems required to form off-axis images of entrance pupils and the like. SPecific applications include a viewfinder for a reflex camera and a spectrometer.

9 Claims, 8 Drawing Figures

PATENTED JUL 10 1973 3,744,391

INVENTOR.
WILLIAM T. PLUMMER
BY Brown and Mikulka
and
Frederick H. Brustman
ATTORNEYS

PATENTED JUL 10 1973 3,744,391

INVENTOR.
WILLIAM T. PLUMMER
BY Brown and Mikulka
and
Frederick H. Braustman
ATTORNEYS

CAMERA WITH A STIGMATIC FRESNEL OPTICAL ELEMENT

BACKGROUND OF THE INVENTION

The aberrations of astigmatism and coma affect most optical apparatus. They are particularly troublesome in those apparatus, referred to as off-axis optical systems, wherein the object and its image lie substantial distances away from the optic (symmetry) axis of the principal image-forming element. The severity of these aberrations increases rapidly with the distance of the object from the optic axis; in consequence, the image quickly deteriorates and the intensity of light within the image decreases, too.

Spectrometers and monochromators typify a class of off-axis optical instruments that suffer severely from astigmatism unless corrected in some manner. They employ a set of mirrors to collimate light emitted at an entrance slit and form an image of the entrance slit at an exit slit with the light. To prevent astigmatism in the image, special off-axis parabolic mirrors must be used in place of conventional concave mirrors. Off-axis parabolic mirrors are generally heavy, fragile, and very expensive to manufacture.

U. S. Pat. application, Ser. No. 98,356, filed by James G. Baker on Dec. 15, 1970 and assigned to Polaroid Corporation describes a reflex camera viewfinder with an off-axis optical system. U. S. Patent applications, Ser. No. 141,253, filed by William T. Plummer on May 7, 1971, and Ser. No. 83,030, filed by Nathan Gold on Oct. 22, 1970, both assigned to Polaroid Corporation, describe novel image-forming focusing screens for that reflex camera viewfinder that incorporate means for preventing or correcting astigmatism. In that reflex camera, astigmatism otherwise results from the off-axis location of its objective lens with respect to the optic axis of the novel focusing screen. The novel focusing screen disclosed therein comprises a flat plate with a reflective surface. The reflective surface forms a plurality of concentric, ellipsoidal-shape segments providing the flat focusing screen with more image-forming power in one azimuth than in an orthogonal azimuth, thereby overcoming astigmatism otherwise introduced (i.e., if the focusing screen had prior art concentric spherical-shape segments) at the focusing screen into the image of the aperture of the objective lens.

SUMMARY OF THE INVENTION

The invention comprises a Fresnel lens-like mirror (referred to herein as a Fresnel mirror) warped around a line, joining points in the objects and the image, by an amount predetermined to overcome astigmatism otherwise present in the image. The Fresnel lens-like mirror, referred to hereinafter as the Fresnel mirror, comprises a plurality of concentric rulings (grooves) of the sort associated with a Fresnel lens. However, they are coated with aluminum or other means for reflecting light. The usual Fresnel mirror behaves substantially like a rotationally symmetric mirror just as the usual Fresnel lens behaves like a rotationally symmetric lens. The present concept can be applied to Fresnel lenses, too, overcoming astigmatism in certain refractive optical systems.

An important application for the present invention is to form an image, substantially free of astigmatism, of an entrance aperture at an exit aperture of limited size so as to reflect a maximum of light passing in through the entrance aperture out through the exit aperture. To accomplish this, the edges of the Fresnel mirror furthest from the entrance and exit apertures are turned up, warping it about a line parallel to the two apertures. This imparts more power to the Fresnel mirror in a sagittal plane than in a tangential plane reducing the astigmatism otherwise present in the image of the entrance aperture. The optimum amount of warping may be determined experimentally by examining the image of the entrance aperture formed by the warped Fresnel mirror. Alternatively, the amount of warping may be predetermined by calculation in a manner described below.

Accordingly, an object of the present invention is a stigmatic Fresnel mirror with a warped surface.

Another object of the present invention is a reflex camera with an improved focusing screen comprising a warped Fresnel mirror.

A further object of the present invention is a spectrometer using a warped Fresnel mirror as its primary image-forming element.

An additional object of this invention is an astigmatic Fresnel optical element with a warped echelle surface.

Other objects of the invention will in part be obvious and will in part appear hereinafter.

The invention accordingly comprises the article possessing the features and properties exemplified in the following detailed disclosure.

DESCRIPTION OF THE DRAWINGS

For a fuller understanding of the nature and objects of the invention, reference should be had to the following detailed description taken in connection with the accompanying drawings wherein.

THE PREFERRED EMBODIMENT OF THE INVENTION

Figure 1A:
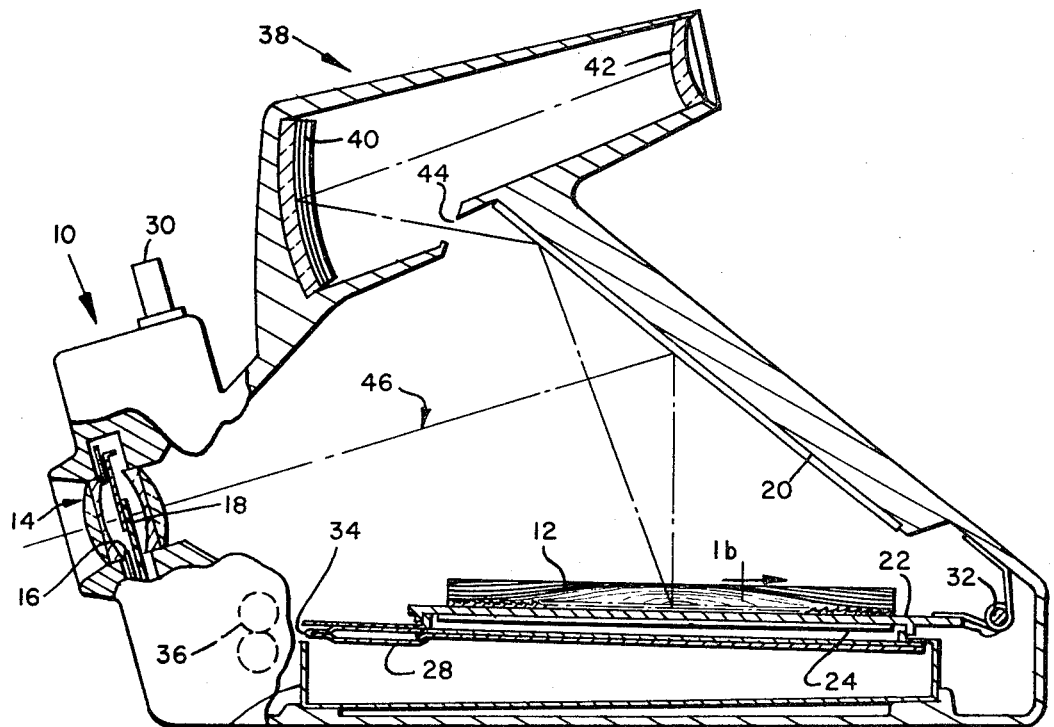
FIG. 1a illustrates a reflex camera embodying the present invention.

The reflex camera 10 includes a warped Fresnel mirror 12 according to the present invention. Also, situate within the reflex camera 10 are an objective lens 14 having an aperture stop 16 and a shutter 18. Light admitted into the reflex camera 10 through the objective lens 14 reflects from a viewing mirror 20 toward the warped Fresnel mirror 12. A carrier plate 22 supports the warped Fresnel mirror 12 on its upper surface and has a recording mirror 24 attached to its lower surface.

The carrier plate 22 fits over a film cassette 26 containing a plurality of self-processing film units 28. It prevents light from accidentally entering the film cassette 26. When a photographer presses a shutter release button 30 to actuate a picture-taking sequence, the carrier plate 22 rotates upward, about an axle 32, uncovering the uppermost film unit 28, until the recording mirror 24 reaches a position parallel to the viewing mirror 20. Light now entering through the objective lens 14 reflects from the recording mirror 24, in its uppermost position, directly onto a photosensitive surface of the film unit 28. The exposed film unit passes through the opening 34 in the film cassette 26 and between a pair of pressure rolls 36 to process the film unit 28 in a well-known manner.

A viewing system 38 in the upper portion of the reflex camera 10 forms a virtual image of any scene that the objective lens 14 forms into a real image on the warped Fresnel mirror 12. It includes a concave mirror 40 and an eye lens 42. The concave mirror 40 receives light from the warped Fresnel mirror 12 through an entrance aperture 44 and forms an intermediate image of the scene on the warped Fresnel mirror 12 between the concave mirror 40 and the eye lens 42. The eye lens 42 magnifies the intermediate lens for the photographer so he can conveniently aim and focus the reflex camera 12. A light ray 46 exemplifies the path of light through the reflex camera 10 and into the viewfinder 38. The light ray 46 enters through the aperture stop 16 of the objective lens 14. The objective lens focuses the light ray 46 and others into an image that the viewing mirror 20 reflects onto the warped Fresnel mirror 12. Reflection from the plurality of faces 13 on the grooves comprising the warped Fresnel mirror 12 sends the light ray 46 through the entrance aperture 44 via another reflection from the viewing mirror 20. After entering the viewfinder 38, the light ray 46 reflects from the concave mirror 40 toward the eye lens 42 and, thence, to an observer's eye.

To promote viewability of the image in the viewfinder 38, as much of the light entering the reflex camera 10 through the aperture stop 16 as possible must enter the viewfinder 38. To accomplish this purpose, the focal length of the warped Fresnel mirror 12 is selected so the entrance aperture 44 is optically conjugate to the aperture stop 16. That is, the warped Fresnel mirror 12 forms an image of the aperture stop 16 at the entrance aperture 44.

However, neither the entrance aperture 44 nor the aperture stop 16 lies on the optical axis (i.e., the rotational axis) of the warped Fresnel mirror 12. The warped shape of the Fresnel mirror 12 substantially corrects the astigmatism that would otherwise spoil the image of the aperture stop 16 at the entrance aperture 44 and reduce the brightness of the image seen through the viewfinder 38.

Figure 1B:
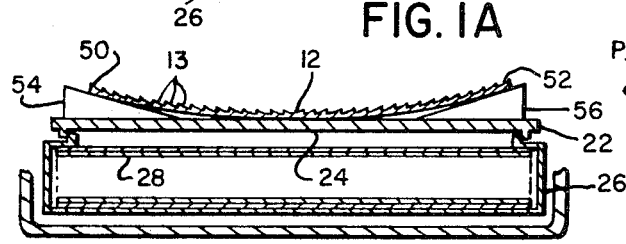
FIG. 1b illustrates a section through the reflex camera of FIG. 1 showing more clearly the invention.

In the instant embodiment, the proper warping of the Fresnel mirror 12 turns its lateral edges 50 and 52 upwards, as shown in FIG. 1b. Usually the Fresnel mirror 12 is made from a plastic such as methyl methacrylate and it will bend readily due to its relative thinness. One means for empirically achieving an appropriate amount of warp across the Fresnel mirror 12 requires fastening the central part of the Fresnel mirror 12 to the upper surface of the carrier plate 22 by an adhesive cement or other suitable means. Forcing the wedges 54 and 56 between their respective edges 50 and 52 and the carrier plate 22, warps the Fresnel mirror 12 upwards imparting more dioptric power to it in the lateral direction than front to back. An experienced optical worker can determine the best location for the wedges 54 and 56 by observing the changing image of the aperture stop 16 formed by the warping Fresnel mirror 12 at the entrance aperture 44 as he moves the wedges 54 and 56. The wedges 54 and 56 should be fixed in their best location.

Fresnel mirrors are generally made so a face of a groove has the same pitch (the angle between the face and the Fresnel mirror's surface) all around its circumference (U. S. Patent application, Ser. No. 141,253, supra, describes a novel exception, but the principles of the present invention also apply to it). Cylindrically warping the Fresnel mirror 12 changes the angle of incidence of light rays on the faces 13 in one azimuth, but not in the orthogonal azimuth. It does not change the pitch, i.e., the angle between a locus on the face and the surface of the Fresnel mirror at that locus remains the same. This imparts different powers to the Fresnel mirror in orthogonal directions to make it stigmatic.

In certain circumstances, a user of the present invention might wish to predetermine the optimum amount of warp for a particular application. A hypothetical case follows to demonstrate a method for calculating the optimum warp for a Fresnel mirror in a specific situation.

Figure 2B:
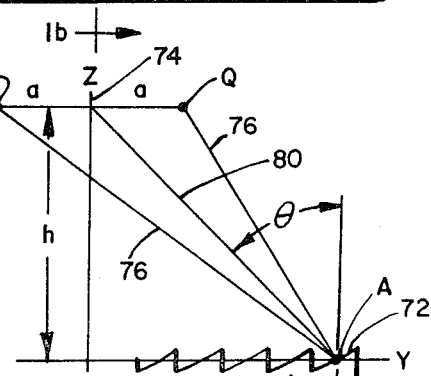
FIGS. 2a, 2b, and 2c are conceptual aids in determining how much to warp a Fresnel mirror in a certain situation.
Figures 2A, 2C:
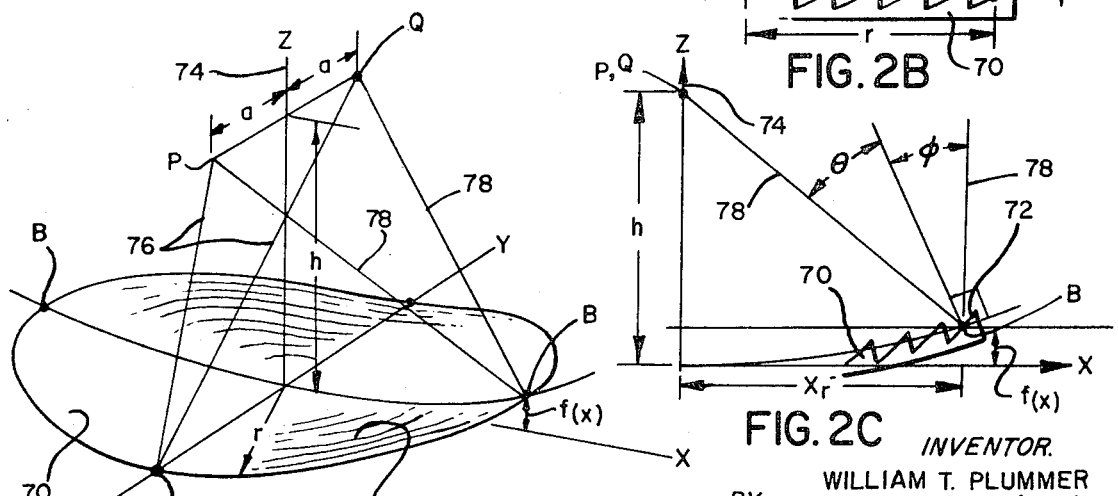

Refer now to FIG. 2a illustrating a warped Fresnel mirror 70 for reflectively forming an image of an off-axis point P, representing an entrance pupil, onto a point Q, representing an exit pupil, with a minimum of astigmatism. For convenience, the $x$, $y$, $z$ coordinate system has its origin at the center of the echelle comprising a plurality of concentric grooves 72 of the warped Fresnel mirror 70. Thus, the $z$ axis is co-linear with the optic axis 74 of the warped Fresnel mirror 70. The $y$ axis lies in the plane determined by the points $P$ and $Q$ and the optic axis 74.

The points P and Q are each separated from the optic axis 74 by a distance a and each is a distance $h$ above the center of the warped Fresnel mirror 70. A light ray 76 proceeds from P to Q via reflection from A on the face of the groove 72 at the unwarped edge of the Fresnel mirror 70. Another light ray 78 proceeds from P to Q via reflection from B on the groove 72 at the upturned edge of the Fresnel mirror 70. The line between the center and locus B indicates the desired curvature (warp) of the Fresnel mirror 70 to minimize astigmatism in the image of P formed at Q. A radius $r$ separates the locus A from the optic axis 74 and for all practical purposes the separation of the locus B from the optic axis 74 also equals the radius $r$.

Two angles will be determined: the first, $\theta$, indicates the general slope of the face of the groove 72, on which the locus A lies, required to reflect the light ray 76 from P to Q; the second, $\phi$, indicates the increase in the general slope, at the locus B, necessary to reflect the light ray 78 from P to Q. The height $f(x)$ that the edge of the Fresnel must be turned up to minimize astigmatism can be determined from the angles $\theta$ and $\phi$.

FIG. 2b, a section through the Fresnel mirror 70 looking in the $x$ direction, shows the $yz$ plane. It shows the angle $\theta$ (the slope of cut) as the angle between a normal 80 to the face of the groove 72 at the locus A and the optic axis.

The following equation expresses the angle $\theta$ as a function of radius ($r$):

$\theta(r) = \frac{1}{2} [\arctan((r+a)/h) + \arctan((r-a)/h)]$.

FIG. 2c, a section through the warped Fresnel mirror 70 looking in the $y$ direction, shows the $xz$ plane with the angle $\phi$ and the distance $f(x)$ that the edge of the warped Fresnel mirror 70 must be turned up so the angle between the optic axis 74 and a normal to the face of the groove 72 at the locus B equals $\theta + \phi$. The normal to the face of the groove 72 at the locus B lies in the plane defined by the light rays 78 and it intersects the optic axis 74. The angle $\phi$ can be expressed two ways:

$\phi = \arctan (df(x)/dx)$; or
$\phi = \arctan (x/h-f(x)) - \theta$.

The initial conditions, restated here, determine $f(x)$: 1) the edges turn up, but the center of the warped Fresnel mirror 70 does not move, i.e., at the optic axis 74 where $x$ 0, $f(x) = 0$; 2) since the slope of the warped Fresnel mirror 70 changes direction at the optic axis 74, the first derivative of $f(x)$ with respect to $x$ is 0, $df(x)/dx = 0$ when $x = 0$. Thus, one can develop the equality: $df(x)/dx = \tan \{ \arctan[x/h-f(x)] - \frac{1}{2}[\arctan (r+a/h) + \arctan (r-a/h) ]\}$.

For convenience, $r$ may be considered substantially equal to $x$ with a negligible effect on the functionality of the resulting warped Fresnel mirror 70. However, $$r(x) = \int_0^x \frac{dx}{\cos\left[\arctan\left(\frac{df(x)}{dx}\right)\right]}$$

or $$r(x) = \int_0^x \sqrt{1+\left(\frac{df(x)}{dx}\right)^2}\, dx$$

are more accurate statements.

The substitution of $r \approx x$ into the expression for $df(x)/dx$ (above) gives a result that can be integrated numerically, with an arbitrarily selected precision. The numerical integration yields a solution for $f(x)$ that will produce precise imaging of light rays emanating from the point P, that reflect from loci A and B, at the point Q. It will now be realized that light rays from the point P reflected by other points along the circumference of the groove 72 that the loci A and B lie on may result in slightly blurred imaging. This results in certain adverse high-order effects analogous to coma in ordinary optical systems. Slightly altering the functions $\theta(r)$ and $f(x)$ by common computer optimization methods will improve the image at the point Q of the point P in the presence of such adverse effects.

One optimizes a focusing screen of specified format by assuming a general polynomial formula to describe the shape and the degree of warpage to the Fresnel mirror. A computer is used to perform optical ray traces from many points on the Fresnel surface to determine how closely the rays come together at the focus. The compactness of the traced rays at the focus serves as a figure of merit for the Fresnel surface. To optimize the shape and the degree of warpage, slight changes are made to the constants of the polynomial and their effect on the figure of merit is determined by further ray tracing. By an iterative process made quite easy with a computer, an optimum shape can be established for a Fresnel surface in a specific application. Computing methods for optimizing optical surfaces are well known in the relevant literature and they are useful for this task.

In a more general case than that described, for example, conjugate points P and Q are different distances from a Fresnel mirror or the aperture of a Fresnel mirror has an asymmetric shape, standard computer optimization procedures will identify the best location for the center of the concentric grooves (echelles) of the Fresnel mirror, vis-a-vis the conjugate points P and Q.

Figure 3:
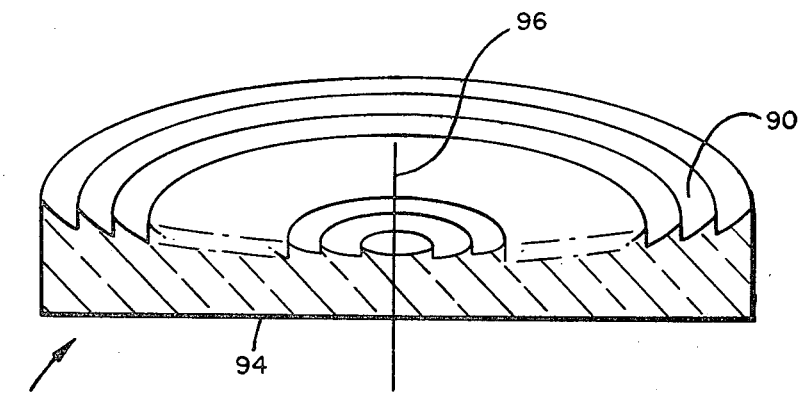
FIG. 3 illustrates an alternate embodiment of the present invention.

In the preceding description, the edges of the mirror were turned up in the $x$ direction imparting a cylindrically concave shape to the warped Fresnel mirror. One will now understand that turning down the edges in the $y$ direction achieves a similarly beneficial result by making the warped Fresnel convex in a perpendicular direction. In a situation requiring minimum departure from flatness of the Fresnel mirror, combining both types of warping will help. A saddle-shape warped Fresnel mirror 89 results. See FIG. 3. In certain asymmetrical optical arrangements, conical rather than cylindrical warpage may yield better results.

While the P and Q conjugates used in the description above represent "real" points or images in the optical sense, the concepts described herein apply also to improving the images when one or both images are virtual.

Figure 4:
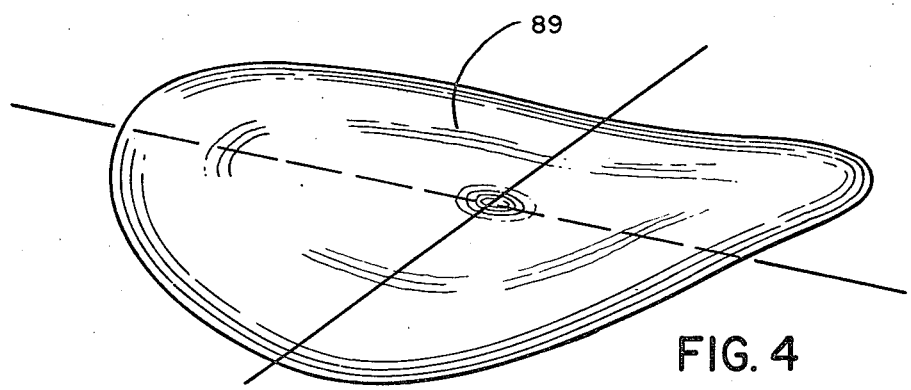
FIG. 4 illustrates still another embodiment of the present invention.

The present concepts, applied to a Fresnel lens, will improve a refracted image. In FIG. 4 a refracting eshelle 90 of a Fresnel lens 92 has a concave cylindrical warp while the rear surface 94 has a shape rotationally symmetric (in this case plano) about the optic axis 96 rather than the cylindrical shape of the echelle 90. In making a Fresnel lens according to these concepts, one must change the rear surface after warping the Fresnel echelle (front) surface to cancel or modify the optical power it would otherwise have.

Although the preceding description suggests bending a thin flexible Fresnel optical element to achieve an appropriately warped shape for making large numbers of a particular warped Fresnel optical element, other techniques are appropriate. For instance, a master warped Fresnel mirror might be made as described. Multiple copies of the master are then fabricated by any of several well-known replicating processes such as those employed in making copies of phonograph records or replicas of diffraction gratings.

Figure 5:
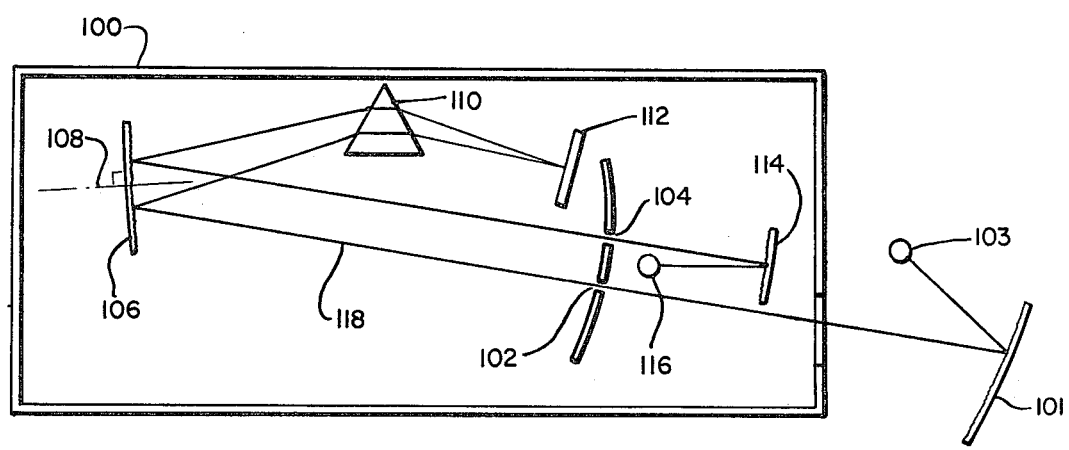
FIG. 5 illustrates a spectrometer embodying Fresnel mirrors according to the present invention.

Another specific application of the present invention deserves mention. A spectrometer in the form of a single-pass monochromator 100 is schematically illustrated in FIG. 5. It comprises an entrance slit 102 and an exit slit 104 lying in the focal plane of the warped Fresnel mirror 106. A warped Fresnel mirror 101 forms an image of a light source 103 onto the entrance slit 102. The warped Fresnel mirror 101 provides a simple means for transferring the maximum amount of light from the light source 103 to the entrance slit 102. In the monochromator 100, the entrance slit 102 and the exit slit 104 lie off the optic axis 108 of the warped Fresnel mirror 106. Thus, they are analogous to the off-axis points P and Q of the preceding description. Appropriate cylindrical curvature imparted to the warped Fresnel mirror 106 about an axis normal to its optic axis 108 and in the plane of the drawing will minimize or eliminate astigmatism otherwise present in the image of the entrance slit 102 formed at the exit slit 104 by the warped Fresnel mirror 106. The warped Fresnel mirror 106 replaces an expensive off-axis parabolic mirror that would normally be used. For certain portions of the spectrum, the use of an optical element with greater resolution than the Fresnel mirror 106 is in order for imaging the entrance slit 102 on the exit slit 104. However, it is adequate for long wavelength infrared radiation. Mirrors 101 and 114 may be warped Fresnel mirrors for any portion of the spectrum without degrading the performance of the spectrometer.

In operation, the warped Fresnel mirror 106 reflects light entering the monochromator 100 through the entrance slit 102 through a prism 110, that disperses the spectral components of the light, and forms an image of the entrance slit 102 on a plane mirror 112. The plane mirror 112 reflects the light back through the prism 110, further dispersing the spectral components of the light, and onto the warped Fresnel mirror 106. On the second incidence of the light at the warped Fresnel mirror 106, it is reflected to the exit slit 104 in the focal plane of the warped Fresnel mirror 106. There the warped Fresnel mirror 106 forms a series of spectrally different images of the entrance slit 102. The spectral image of the entrance slit 102 that lines up with the exit slit 104 escapes to the image-forming mirror 114 that directs it to a detector 116. The image-forming mirror 114 is arranged to form an image of the exit slit 104 in front of or behind the detector 116, but generally not directly on it. Since the detector 116 and the exit slit 104 both lie off the optic axis of the image-forming mirror 114, a warped Fresnel mirror might be useful here, also. A line 118 indicates the general light path through the monochromator 100 just described.

It can be readily understood now that many variations and modifications of the present invention are possible in light of the foregoing teachings, and it will be apparent to those skilled in the art that various changes in form and arrangement may be made to suit certain requirements without departing from the scope of the invention. It is, therefore, to be understood that within the scope of the appended claims, the instant invention may be practiced in a manner than otherwise specifically described herein.

What is claimed is:

1. A reflex camera, comprising:
   housing means;
   objective lens means with an aperture stop, situate in a wall of said housing means, for forming a real image of a subject at a focal plane within said housing; and
   a focusing screen, at said focal plane, with a reflective surface for receiving said image, said reflective surface including a plurality of concentric grooves, each of said grooves having a face that cooperates with the faces of the other of said grooves to receive light from said aperture stop and reflect it into an image of said aperture stop, said image of said aperture stop being separated from said aperture stop, said surface having a warp for ameliorating astigmatism otherwise present in said image of said aperture stop.

2. The reflex camera described in claim 1, wherein said surface having said warp has a generally cylindrical shape.

3. The reflex camera described in claim 2, further comprising:
   viewing means, superposed on said housing, for observing said image formed on said reflective focusing screen;
   an entrance aperture, in said housing means, for allowing optical communication between said housing means and said viewing means; and
   an optic axis for said reflective focusing screen, said entrance aperture and said aperture stop being arranged so both lie off said optic axis.

4. The reflex camera described in claim 3, wherein said reflective focusing screen forms an image of said aperture stop at said entrance aperture and the edges of said focusing screen furthest from a plane determined by said optic axis and said aperture stop are bent upwards an amount sufficient to minimize the astigmatism otherwise present in an image of said aperture stop formed by said reflective focusing screen means at said entrance aperture.

5. In a reflex camera of the type having: a housing; an objective lens with an aperture stop, situate in a forward wall of said housing; a focusing screen having a surface in the focal plane of said objective lens; a viewer; and an entrance aperture located in said housing so light from said focusing screen can enter said viewer; wherein said focusing screen is located so it forms an image of said aperture stop at said entrance aperture; the improvement comprising:
   a warp, in said surface of said focusing screen, for minimizing astigmatism in the image of said aperture stop at said entrance aperture, said surface including a plurality of grooves, each groove having a face and said face having a uniform slope with respect to said warp everywhere on said surface.

6. The improved reflex camera described in claim 5, wherein said plurality of grooves is concentric and has an axis of symmetry that defines the optic axis of said focusing screen, said optic axis bisecting the angle defined by the reflection of an axial light ray from said objective lens at the center of said concentric grooves.

7. The improved reflex camera described in claim 5, further comprising:
   means for specularly reflecting light from said faces, and wherein the lateral edges of said warp on said surface curve upwardly about the plane defined by the centers of said objective lens, said focusing screen, and said entrance aperture.

8. A reflex camera, comprising:
   housing means;
   objective lens means with an aperture stop, situate in a wall of said housing means, for forming a real image of a subject at a focal plane within said housing; and
   a focusing screen, at said focal plane, with a reflective surface for receiving said image, said reflective surface including a plurality of concentric grooves, each of said grooves having a face that cooperates with the faces of the other of said grooves to receive light from said aperture stop and reflect it into an image of said aperture stop, said image of said aperture stop being separated from said aperture stop, said surface having an anamorphic contour for ameliorating aberrations otherwise present in the image of said aperture stop formed by said focusing screen.

9. The reflex camera described in claim 8, wherein said anamorphic contour is a cylindrical curve for reflecting light from said aperture stop into a stigmatic image of said aperture stop.

* * * * *